June 20, 1961 R. A. BADGER 2,989,111
FLAKE MICA SEPARATING AND FILM FORMING MACHINE
Filed June 24, 1959 5 Sheets-Sheet 1
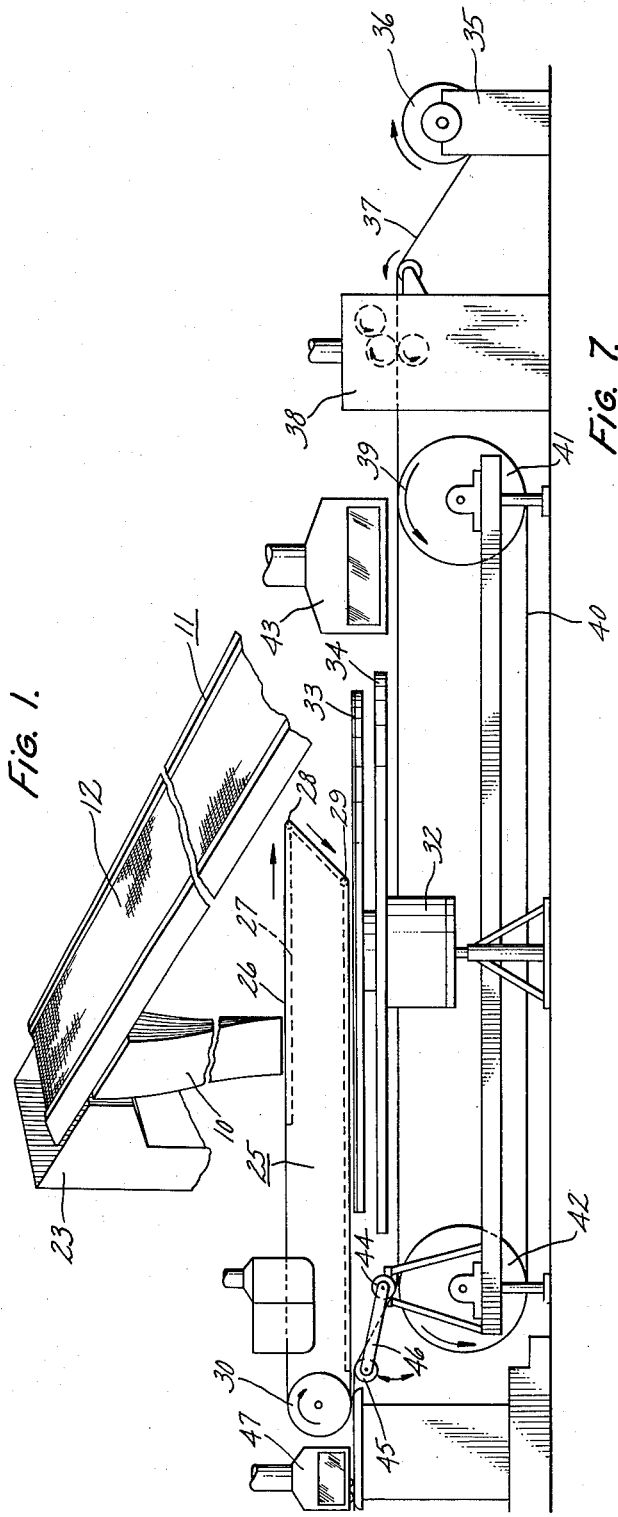
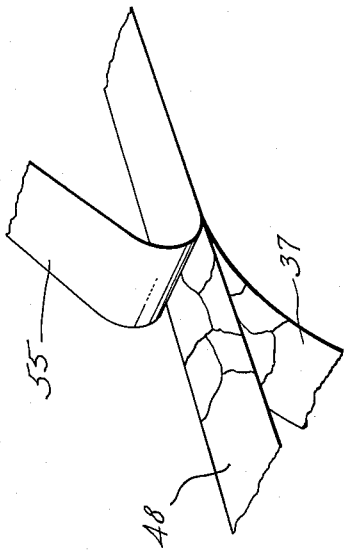
Inventor:
Richard A. Badger
by Richard L Caelin
His Attorney

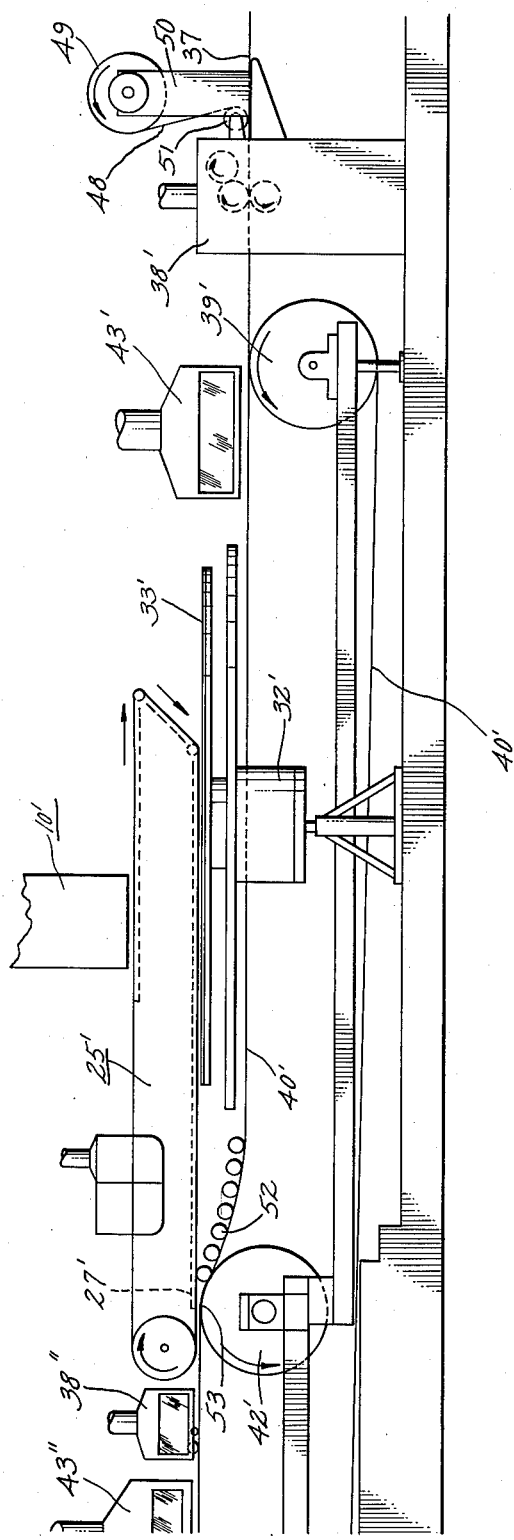

June 20, 1961 R. A. BADGER 2,989,111
FLAKE MICA SEPARATING AND FILM FORMING MACHINE
Filed June 24, 1959 5 Sheets-Sheet 3

Inventor:
Richard A. Badger
by Richard L Caslin
His Attorney

June 20, 1961 R. A. BADGER 2,989,111
FLAKE MICA SEPARATING AND FILM FORMING MACHINE
Filed June 24, 1959 5 Sheets-Sheet 4

Inventor:
Richard A. Badger
by Richard L. Caslin
His Attorney

June 20, 1961  R. A. BADGER  2,989,111
FLAKE MICA SEPARATING AND FILM FORMING MACHINE
Filed June 24, 1959  5 Sheets-Sheet 5

Inventor:
Richard A. Badger
by Richard L Caslin
His Attorney

# 2,989,111
// Patented June 20, 1961

2,989,111
FLAKE MICA SEPARATING AND FILM FORMING MACHINE
Richard A. Badger, Scotia, N.Y., assignor to General Electric Company, a corporation of New York
Filed June 24, 1959, Ser. No. 822,610
8 Claims. (Cl. 154—2.5)

The present invention relates to a precision method and the automatic equipment for collecting single thickness mica flakes from clumps of flakes and of evenly distributing the single flakes in a uniform layer where the flakes are bonded in place to form a thin mica film.

Mica is a unique material which has great value as electrical insulation because of its electrical, mechanical and chemical properties and the form in which it is available as an engineering material, i.e., thin flexible films of high dielectric strength and great thermal stability. Natural mica includes several forms of mineral silicates which were crystallized during their formation under tremendous pressure while cooling very slowly from the molten state. There is preferential orientation of the crystalline structure producing thin parallel laminae. It is characterized by highly perfect cleavage so that it readily separates into very thin leaves, flakes or splittings.

India is the primary source of natural mica in the world. Native laborers are used in large numbers to split the raw or crude mica from blocks or clumps into thin mica flakes. Unfortunately, this method is the best and most economical way of obtaining mica flakes but it is no better than the people that are engaged in this work. Oftentimes unsplit flake material will appear in the containers of flakes that are received by the mica insulation producer. These thick splits of flakes must be removed from the single thickness flakes because they would destroy the uniformity and flexibility of the mica film product. Hence the mica flakes must be separated so that only the single thickness flakes will be collected and distributed onto a belt to form a thin mica film. Such a mica film may be combined with similar films or with carrier tapes of paper fabric, or synthetic films such as Mylar to form a composite mica structure.

This invention is a solution to the problem of providing automatic precision equipment for transporting, separating, collecting and laying single thickness mica flakes in a uniform layer onto a carrier material or belt without the formation of voids between adjacent flakes. For several decades the mica has been transported by either bucket elevators or forced air systems into a snowing tower where the mica flakes and clumps of flakes descend directly onto a conveyor belt or onto a perforated vacuum drum which lays the flakes onto a carrier material in a non-uniform layer that is replete with voids. First, the flakes were never properly classified and separated to insure that only single thickness flakes would be used, and a large amount of direct labor was necessary to correct the layer of mica flakes and patch the voids. This is not only an unscientific procedure; it is also unreliable, nerve-racking to the operators and a costly program to support.

The principal object of the present invention is to provide a continuous precision process for transporting and isolating single thickness mica flakes so that they may be evenly distributed into a uniform layer wherein all voids will be patched automatically before the flakes are bonded to each other; the process substantially eliminating the attrition or degradation of the mica flakes.

A further object of the present invention is to provide the novel equipment for transporting mica flakes to the top of a snowing tower and of classifying the flakes so that only the single thickness flakes will be fed into the tower.

A further object of the present invention is to provide a vacuum conveyor belt at the bottom of a snowing tower of a mica film forming machine so as to distribute the flakes into a uniform layer and discard the excess flakes that might accumulate on the layer.

A still further object of the present invention is to provide an automatic patching means in the form of a revolving turntable for use with a vacuum conveyor belt so as to recover the excess flakes and feed them back to the mica layer for closing any voids that might have developed in the layer.

The process of the present invention incorporates the various steps of first classifying the mica flakes as they are received from the raw material supplier, and separating out only the single thickness flakes for discharging into the top of a snowing tower, of receiving the flakes at the bottom of the tower onto a vacuum conveyor belt whereon the flakes are evenly distributed into a uniform layer, of removing the excess flakes and returning the excess flakes to the layer where they may be used to close any voids that might have developed in the layer, then removing the layer from the belt and placing it on a carrier material where the flakes are bonded together to form a mica film.

A preferred embodiment of the present invention utilizes a vacuum conveyor belt that is inclined upwardly to carry a supply of mica flakes to the top of a snowing tower. The top end of the conveyor has a tapered section that converges down to a sharp radius bend where the belt slides over a small diameter roller that is provided with a series of circular fins so that the vacuum pressure is maintained under the belt. This sharp bend in the belt takes into account one important characteristic of a single thickness flake, namely, its flexibility. If two flakes adhere one over the other, they will lose their flexibility. Accordingly, the theory of this invention is to utilize a vacuum belt with a sharp radius bend that will separate the single thickness flakes from multiple flakes by use of the test of flexibility. By this technique, a single thickness flake may be isolated with precision control because the flake is capable of bending around the periphery of the small roller with its full surface area in contact with the belt so that the vacuum pressure will be strong enough to retain the flake until it moves beyond the roller. If a flake is of double or triple thickness, it will be substantially rigid so that it tends to continue in the same direction it was moving before it met the small roller. Hence, the multiple flake will only have a small area of contact with the belt which reduces the effect of the vacuum pressure on the flake until finally the multiple flake will sail off the belt. An imperforate baffle is arranged just above the return side of the belt a fixed distance from the small diameter roller so as to break the vacuum under the belt at that point and discharge the single thickness flakes into the top of a snowing tower.

The single flakes will float down the tower and land on a second vacuum conveyor belt that is arranged in a horizontal plane at the bottom of the tower. The vacuum will attract the flakes to the belt to form a continuous layer. This layer travels with the belt over a sharp radius bend at the end of the conveyor. The purpose of this second sharp radius bend is to discharge any excess flakes that might have accumulated on top of the single thickness layer. These excess flakes would not be attracted to the belt by the vacuum because of the complete coverage of the belt by the underlying layer of mica flakes. Hence, the momentum of the excess flakes and the absence of a holding force will sail the excess flakes off the end of the belt, while the single thickness layer will wind around the small roller and along the return side of the belt.

One half of a large rotating turntable is positioned under the return side of the belt and it is capable of catching the excess flakes as they are discharged from the belt. The turntable carries the excess flakes back under the return side of the belt where the flakes are agitated mechanically or pneumatically so that in the event that there are any voids in the single thickness layer the vacuum pressure within the conveyor belt will draw enough flakes from the floating bed of flakes on the turntable to patch the voids. As the continuous layer of single thickness flakes travels on, the vacuum is broken by a solid baffle so that the layer is carefully lowered onto a traveling paper carrier tape which had previously been treated with a binder so that the flakes will be bonded to each other and to the paper carrier.

Suitable laminations of mica and/or carrier layers can be formed by installing a second piece of equipment set up in tandem with the first previously mentioned apparatus. The second machine will accurately place a continuous layer of mica flakes onto the original layer of mica or onto a second paper carrier tape that had previously been bonded over the flakes on the first tape. Finally, a plain paper tape may be bonded over the top layer of mica flakes to form the completed product.

My invention will be better understood from the following description taken in connection with the accompanying drawings and its scope will be pointed out in the appended claims.

FIGURES 1–3 represent a composite view of three segments of a continuous machine for transporting, separating, placing, correcting and bonding a uniform layer of single thickness mica flakes to a carrier tape that is moving from right to left in the figures.

FIGURE 1 is a side elevational view of one complete system for placing the mica flakes onto a moving carrier tape.

FIGURE 2 is a continuation of FIGURE 1 showing the mid-section of the machine, and being nearly a duplicate of the machine section of FIGURE 1.

FIGURE 3 is a continuation of FIGURE 2 showing the take-up arrangement for winding the completed product on a reel.

FIGURE 7 shows by way of example a perspective view of a short length of narrow mica tape formed by laminations of three paper carrier tapes with two layers of mica flakes sandwiched therebetween.

Figure 3:
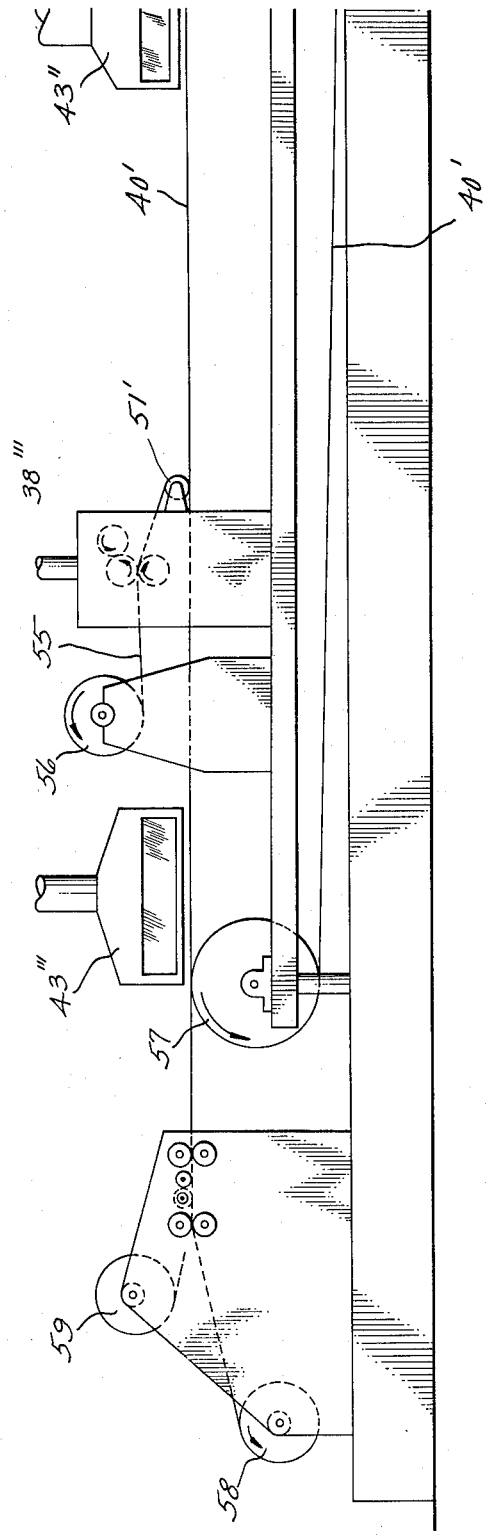

Referring in detail to the drawing and in particular to FIGURE 1, 10 represents a snowing tower down which the single thickness mica flakes are to float. First, there is the problem of transporting the flakes to the top of the tower. This is solved by an inclined vacuum belt conveyor 11 that is shown in greater detail in FIGURES 5 and 6. The actual belt 12 is between 24" and 40" wide. Also, it is foraminated since it is of coarse woven steel wire mesh construction that is strong yet flexible enough to bend around a sharp radius. A suitable drive roller 13 is arranged at the lower end of the conveyor for driving the belt 12 in a counterclockwise direction. At the upper end of the conveyor are a pair of small idle rollers 14 and 15 which first change the direction of the movement of the belt and then wind the belt over a sharp radius and nearly back on itself to establish a converging section for the conveyor. The first roller 14 is arranged ahead of the second roller so that the belt reverses its direction from an upward direction as it approaches the roller 14 to a downward direction as it leaves the roller 14. The second roller 15 represents a sharp radius bend around which the belt is carried to the return side of the conveyor as it moves back toward the drive roller 13. This roller 15 will cause difficulties in controlling the separation if it is over 3" in diameter. A preferred size is 1½" in diameter.

Figures 5, 6:
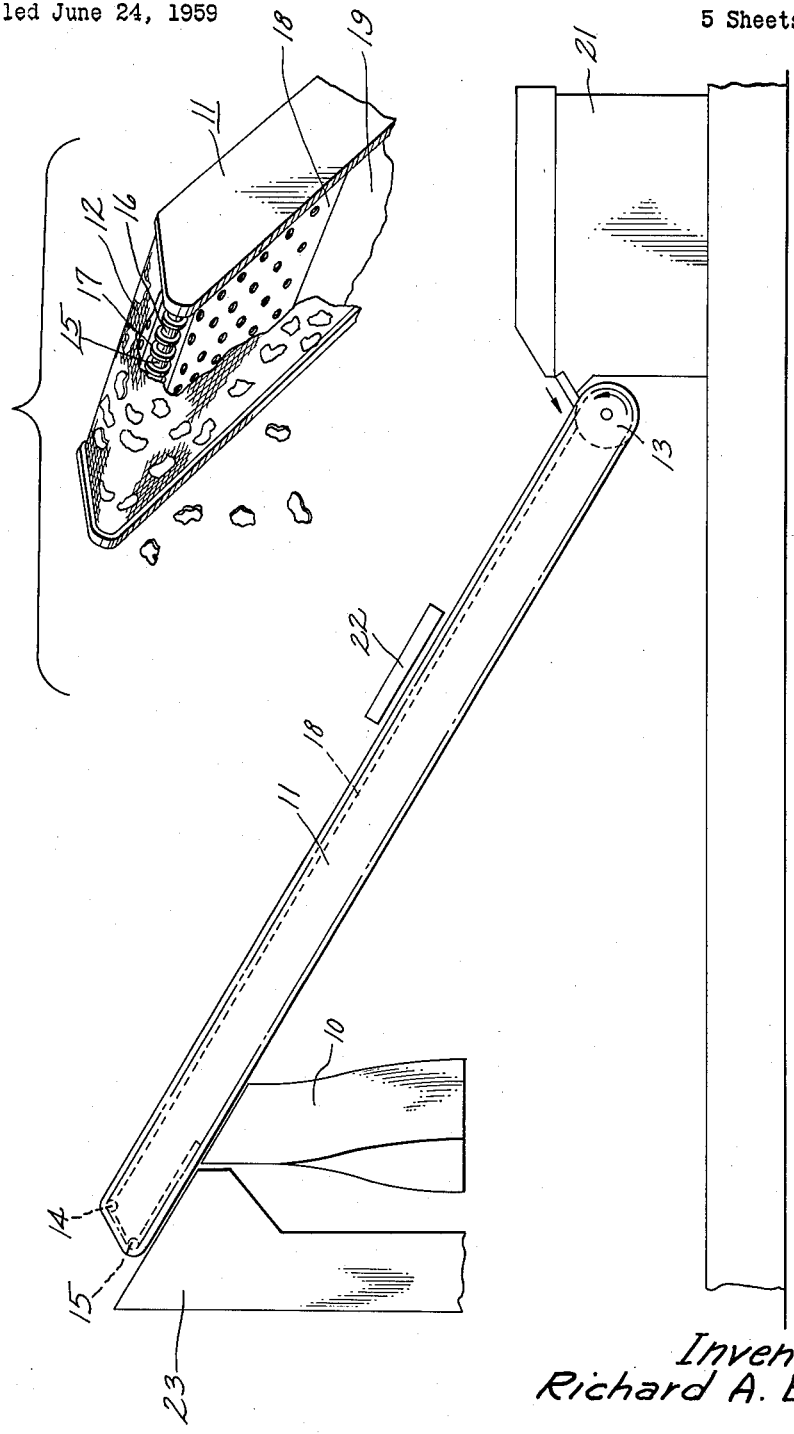
FIGURE 5 is a side elevational view looking directly at the vacuum conveyor belt for transporting the mica flakes to the top of the snowing tower.
FIGURE 6 is an enlarged view of the top end portion of the vacuum conveyor belt of FIGURE 5 showing in detail the foraminated belt of woven wire structure a small diameter roller with a series of spaced circular fins and lastly, a perforated baffle which is associated with the underside of the belt for establishing a vacuum within the conveyor system.

Looking at FIGURE 6, the second small roller 15 is seen because a portion of the belt 12 has been broken away. This roller 15 is formed by a small diameter rod 16 supporting a series of circular fins 17. Such a finned roller, as rollers 14 and 15, serves to support the belt as the belt travels around the roller so as not to interfere with the uniform vacuum pressure along the roller whereby the single thickness flakes will continue to adhere to the belt as the belt travels around the sharp radius. Also shown in FIGURE 6 is a short section of perforated baffle 18 which is positioned close to the underside of the belt 12 to form constrictions to the flow of air through the belt. This baffle 18 is represented by the dash lines in FIGURE 5 and it extends the complete length of the top of the conveyor from the drive roller 13 to the first idle roller 14 and then between the two rollers 14 and 15 and then back down the return side of the conveyor for a short length. The remainder of the return side of the conveyor is closed as is illustrated at 19 in FIGURE 6. This perforated baffle 18 is of primary importance in the success of this invention because it establishes a large central reservoir that enables the uniform distribution of the vacuum pressure over the working area of the belt. The baffle is broken at each roller 14 and 15 to form elongated slots or openings for the passage of a larger volume of air to accommodate the larger surface area of the belt being handled in the vicinity of the rollers. There is a slight reduction in the vacuum at the rollers due to the obstructions to the smooth flow of the air caused by the rollers. This is actually an advantage in controlling the precision of the separation of the flakes.

A large storage container 21 is positioned at the bottom of the vacuum conveyor 11 and either a person will be stationed here to feed the flakes onto the moving belt by hand or an automatic feed will be provided that will evenly distribute the flakes onto the belt at a rate between one to six pounds per minute depending upon the speed of the belt and the speed of the remainder of the equipment. During the raising of the flakes up the conveyor, foreign particles will be removed from the flakes by the vacuum pressure within the conveyor as well as by a permanent magnet 22 that closely overlies the belt to pick up any small metal objects. The speed of the belt is variable anywhere between 30 to 200 feet per minute. The flakes reach the top of the conveyor and ride over the first idle roller 14 and move quickly toward the sharp radius bend at the second idle roller 15. The single thickness flakes are almost as flexible as a thin piece of paper and they will bend easily around the sharp radius and travel down the return side of the conveyor. On the contrary, multiple thicknesses of flakes are relatively stiff and they tend to continue in the same direction they are traveling as they reach the sharp radius. In other words, the leading edge of the multiple flakes will move in a straight line away from the belt and there will be a gradual reduction in the area of contact between each flake and the belt while the vacuum holding force will be reduced in direct proportion to the reduction in area. The speed of the belt is such that the vacuum pressure never regains control of the multiple flakes and such flakes will fall directly into the hopper 23, while the single thickness flakes will continue to travel on the conveyor for an amount equal to the extent of the perforated baffle 18. As the single thickness flakes move beyond the perforated baffle and into the zone of the solid plate 19, the vacuum will be broken and the flakes will be discharged into the top of the snowing tower 10.

The most popular present day method of classifying and separating the single thickness flakes from clumps of flakes is by visual inspection using as a criteria the difference in color between the single thickness flake and a clump. The clumps are much darker. However, this method is most time consuming and inaccurate because the color difference is slight and the human response very slow. This bottleneck has been eliminated by the vacuum conveyor 11 which both transports and separates the flakes using only the single thickness flakes for discharge into the snowing tower.

Turning back to a consideration of FIGURE 1 of the drawing, the three main components which have been discussed above are a snowing tower 10, the vacuum conveyor belt 11 and the hopper 23 for receiving the clumps of flakes. The single thickness flakes will float down the snowing tower 10 as leaves falling from a tree in the fall of the year. Located directly below the bottom of the snowing tower to catch the flakes is a second vacuum conveyor 25 that extends horizontally to present a traveling belt 26 that will attract the flakes to form a uniform layer over the belt. This conveyor 25 has a perforated baffle 27 which is shown by the dash lines in FIGURE 1 and is comparable to the perforated baffle 18 of the inclined vacuum conveyor 11. This perforated baffle 27 extends for about one half of the top side of the conveyor and between the two idle rollers 28 and 29 and for most of the return side of the conveyor until a point closely adjacent the drive roller 30. This second vacuum conveyor 25 differs mainly from the first conveyor in that the sharp radius bend is adjacent the top side of the conveyor at roller 28 rather than at the lower return side as is roller 15 in FIGURE 5. The purpose of the sharp radius of this second vacuum conveyor is to shave off or remove any excess flakes that accumulate on the single layer that is in direct contact with the belt 26. The excess flakes will not be held to the belt because the vacuum works only against the first complete layer. Hence, at the sharp radius of the finned roller 28, that is comparable to roller 15 in construction, the excess flakes will sail off the belt while the single layer of flakes will travel around the roller in unison with the belt. It finally will be moving along the return side of the belt in the direction of the drive roller 30.

Figure 4:
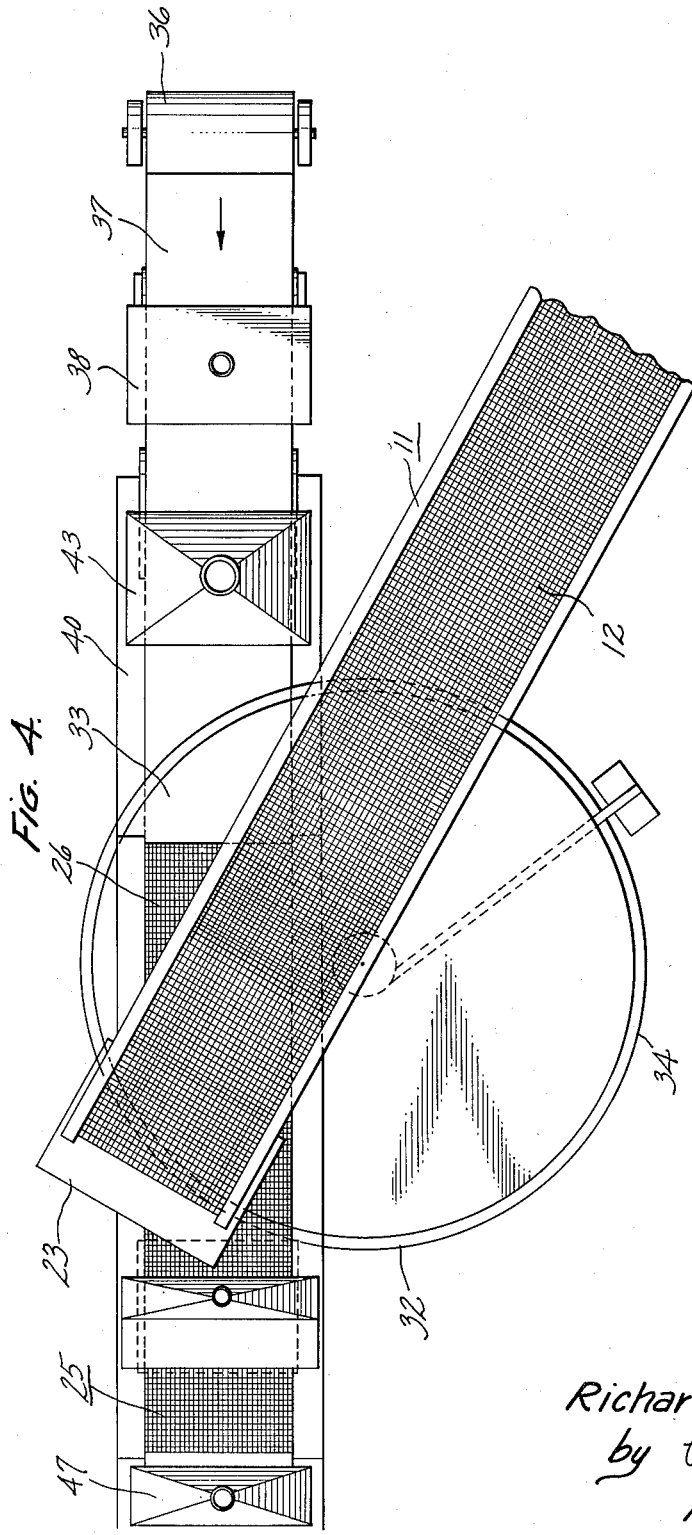
FIGURE 4 is a top plan view of the machine section illustrated in FIGURE 1.

In the event that small voids exist in the single layer of flakes, an automatic method of patching the voids is provided by the use of a large turntable assembly 32 with a movable table 33 that has its pivotal axis arranged slightly to the side of the vacuum conveyor 25 as is best seen in the top plan view of FIGURE 4. This view shows the inclinded vacuum conveyor 11, the hopper 23 at the top of the conveyor for receiving the clumps of flakes, the horizontally disposed vacuum conveyor 25 and the large turntable assembly 32. The turntable comprises a suitable stand or support with a fixed table 34 underlying the movable table 33. Moreover, there is an elevating means for adjusting the height of the table 33 with respect to the return side of the conveyor 25. The fixed table 34 is larger in diameter than the movable table 33 so as to catch the refuse that is cleared from the movable table by centrifugal force. This table 33 is so positioned that the excess flakes that are ejected from the end of the vacuum conveyor 25 will be retrieved and stored on the table and carried back under the return side of the conveyor. There the excess flakes will be agitated and dusted against the mica layer so that if a void appears in the layer of flakes that adhere to the traveling belt, the vacuum pressure will attract enough flakes from the table until a continuous layer is formed on the belt.

Once the film of flakes is made continuous, it is necessary to bond the flakes together to form the final product. The layer of flakes may either be bonded to other layers directly to form mica sheets or the layer may be combined with a carrier material or substrate of paper, glass cloth, etc. to form mica laminates. Looking at the right side of FIGURE 1, there is shown a pay-off stand 35 supporting a reel of paper 36 which is unwound to supply a wide paper tape 37 to the machine for picking up the mica layer. First, the paper tape 37 passes through a booth 38 where a suitable resin binder is applied to the top side of the paper. Then the paper tape travels onto an endless conveyor 39 that has a belt 40 supported on rollers 41 and 42 and is located directly under the vacuum conveyor 25 and below both tables 33 and 34 of the turntable assembly 32. As the paper tape 37 arrives on the endless conveyor 39, it is first exposed to the drying action of a hood shaped dryer 43 having infrared heating elements that are directed toward the top side of the paper tape to reduce the tackiness of the resin. In rolling contact with the roller 42 at the end of the endless conveyor 39 is a small plain roller 44 which also cooperates with a swinging roller 45 that is supported by pivoted links 46 and is spring biased upwardly against the underside of the traveling belt 26 of the conveyor 25. The paper tape 37 is pulled under the roller 44 and over the roller 45 so that the paper is in actual contact with both the endless belt 40 and the underside of the belt 26. Attention is drawn to the fact that the perforated baffle 27 ends at the line of contact of the roller 45. Hence, the vacuum is broken at this point and the flakes will be transferred to the paper tape and in turn bonded to each other as the tape moves to the left. At this point there is a second resin spreader 47 in the form of a standard drip knife coater which applies a coating over the top surface of the film of mica flakes.

Turning now to a consideration of the central section of the machine as illustrated in FIGURE 2, a second layer of paper is bonded over the mica film. This second paper tape 48 is unwound from a reel 49 supported on a raised tape stand 50. The second tape 48 passes under a pressure roller 51 which forces the two tapes 37 and 48 together, it being understood that there is a mica layer sandwiched therebetween. As the laminated tapes move to the left, they will pass through a second booth 38' that is comparable to booth 38 for spreading resin over the top surface of the tape. The illustration of FIGURE 2 is a duplication of much of the equipment described in FIGURE 1. Accordingly, the same structure illustrated in FIGURE 2 will be identified by the same reference numerals but the reference numerals will be primed. There is a snowing tower 10' that discharges onto a horizontally disposed vacuum conveyor 25' which in turn discharges excess mica flakes onto the movable table 33' of a large turntable assembly 32'. The laminated paper tapes 37 and 48 will be carried on the endless conveyor 39' and will travel under a drying hood 43' until the laminated tapes reach the series of small guide rollers 52 which hold down the belt 40' so that it may pass under the turntable 33'. The laminated tapes will receive the second continuous layer of mica flakes at a point 53 that is at the top of the roller 42', which is also the point where the perforated baffle 27' terminates. At this stage of manufacture there is a buildup of a paper tape 37, a layer of mica flakes, a second paper tape 48 and a second layer of mica flakes.

Finally, it is desirable to place a third layer of paper 55, shown in FIGURE 3, over the two laminated tapes. Before the third layer is applied, the laminated tapes pass under a resin spreader 38" and a dryer 43" shown in FIGURE 2. The third paper tape 55 is unwound from a reel 56 and it passes through a booth 38''' for spreading a coating of resin over the underside of the paper before it is pressed against the laminated tapes by the pressure roller 51'. Attention is drawn to the fact that the endless belt 40' does not wind around the roller 42' but instead continues onward to the left and around the large roller 57, and from there it returns to the previously mentioned roller 39', as is best seen in FIGURE 2. Again there is another dryer 43''' which is exposed to the top of the three laminated tapes before the tapes are wound on either one of the alternate take-up reels 58 or 59.

While this invention has been described as including the bonding of the mica flakes to carrier tapes, it should be recognized that the carrier tapes may be eliminated and the mica layer placed directly onto the steel mesh conveyor belt where the flakes may be bonded together by applying the resin with a standard drip knife coater. Also, laminates or composites may be formed that are different from the structure illustrated in FIGURE 7.

Another modification would be to utilize a single conveyor belt for the carrier material with a flat top run to avoid the use of the rollers 44, 45 and 52. In this example each of the vacuum conveyor belts 25 and 25' will include a downwardly deflected section which will lower the mica layer onto the carrier material or belt.

Having described above my invention of a novel method of producing a continuous mica film with little or no direct labor applied to the product, it will be readily apparent to those skilled in this art that I have produced an automatic machine for carrying out the invention, I have provided pieces of equipment for handling the mica flakes so as to substantially eliminate material attrition, product uniformity has been insured and a continuous process of laminating various layers of mica flakes to form mica sheets, tapes, laminates or composites.

Modifications of this invention will occur to those skilled in this art and it is to be understood, therefore, that this invention is not limited to the particular embodiments disclosed but that it is intended to cover all modifications within the true spirit and scope of this invention.

What I claim as new and desire to secure by Letters Patent of the United States is:

1. A vacuum belt conveyor for use with a flake mica film forming machine, said conveyor comprising an endless foraminated belt to receive a layer of deposited mica flakes, vacuum means for withdrawing air within the belt, an elongated roller of small diameter at one end of the belt for turning the belt over a sharp radius, said elongated roller having a discontinuous outer surface communicating with the interior portion of the roller to retain controlled vacuum pressure on the belt as it passes around said sharp radius and a perforated baffle means associated with the inner side of the belt for withdrawing air within the belt with precision control and substantial uniformity.

2. The vacuum belt conveyor of claim 1 having in combination therewith means positioned beneath said vacuum belt conveyor for continuously introducing a supply of mica flakes to said foraminated belt after it has passed the sharp radius.

3. A vacuum conveyor belt for use with a flake mica film forming machine, an elongated roller at one end of the belt, the roller having a series of longitudinally spaced circular fins of small diameter for turning the belt over a sharp radius, and perforated baffle means associated with the underside of the belt so that the air within the conveyor may be withdrawn with precision control and substantial uniformity over the surface of the belt to create a vacuum therein, the finned roller serving to retain the vacuum on the belt as the belt passes around the roller.

4. A vacuum belt conveyor for use with a flake mica film forming machine comprising an endless foraminous belt, the belt being mounted on a group of rollers and driven in a given direction, an elongated roller of small diameter at one end of the belt for turning the belt over a sharp radius, the said elongated roller having a discontinuous outer surface that communicates with the interior portions of the roller, and vacuum means associated with the belt so that the air within the belt may be withdrawn to create a vacuum therein, the discontinuous outer surface of said elongated roller serving to retain the vacuum on the belt as the belt passes around this roller.

5. A vacuum conveyor belt for use with a flake mica film forming machine comprising drive and idle rollers on which a foraminated belt travels, a perforated baffle underlying the major extent of the belt, the sides of the conveyor being substantially closed to form a box-like housing, the air within the housing being withdrawn through a suitable opening in one side of the housing, the perforations in the baffle serving to evenly distribute the vacuum pressure over the adjacent area of the belt to obtain precision control of the air flow through the belt.

6. A process for forming a continuous uniform layer of mica flakes of controlled thickness comprising the steps of distributing mica flakes on a surface to form a continuous layer, maintaining the layer on the surface by vacuum pressure, and removing excess flakes from said continuous layer by passing the layer over a sharp radius of controlled vacuum pressure so that outer portions of said layer of insufficient flexibility to be attracted by said vacuum pressure are continuously discarded, said layer being maintained on the surface while passing over said sharp radius.

7. A process for forming a continuous uniform layer of mica flakes of controlled thickness comprising the steps of distributing the mica flakes over a surface of a traveling foraminous vacuum belt to form a continuous layer, maintaining the layer on the surface by vacuum pressure, removing excess flakes from said continuous layer by passing the layer over a sharp radius of controlled vacuum pressure so that outer portions of said layer of insufficient flexibility to be attracted by said vacuum pressure are continuously discarded, maintaining said layer on the vacuum belt conveyor after passing over said sharp radius, introducing a supply of flakes to said continuous layer after passing over the sharp radius, said supply of flakes being attracted by the vacuum pressure at portions of the continuous layer of mica flakes of less than a predetermined thickness, thereby forming a continuous layer of mica flakes of uniform predetermined thickness.

8. A process for placing thin mica flakes in a uniform layer of controlled thickness comprising the steps of raising the flakes to the top of a tower where the flakes are classified and only the thinner flakes are delivered to the tower where they will descend by gravity, of distributing the flakes at the bottom of the tower uniformly over the surface of a traveling vacuum belt, and of discarding the excess flakes when the belt travels over a sharp radius of controlled vacuum pressure at one end thereof, maintaining the retained mica flakes on said vacuum belt after said flakes have travelled over the sharp radius, and of introducing a supply of flakes at a point beneath the belt shortly after it has made the sharp turn at one end thereof, so that if any voids exist in the layer of mica flakes the voids may be covered to form a uniform layer.

References Cited in the file of this patent

UNITED STATES PATENTS

| | | |
|---|---|---|
| 1,730,568 | Furnas et al. | Oct. 8, 1929 |
| 1,913,876 | Frederick | June 13, 1933 |